E. S. RALPH.
SAFETY PIN.
APPLICATION FILED DEC. 5, 1919.
1,360,794.
Patented Nov. 30, 1920.
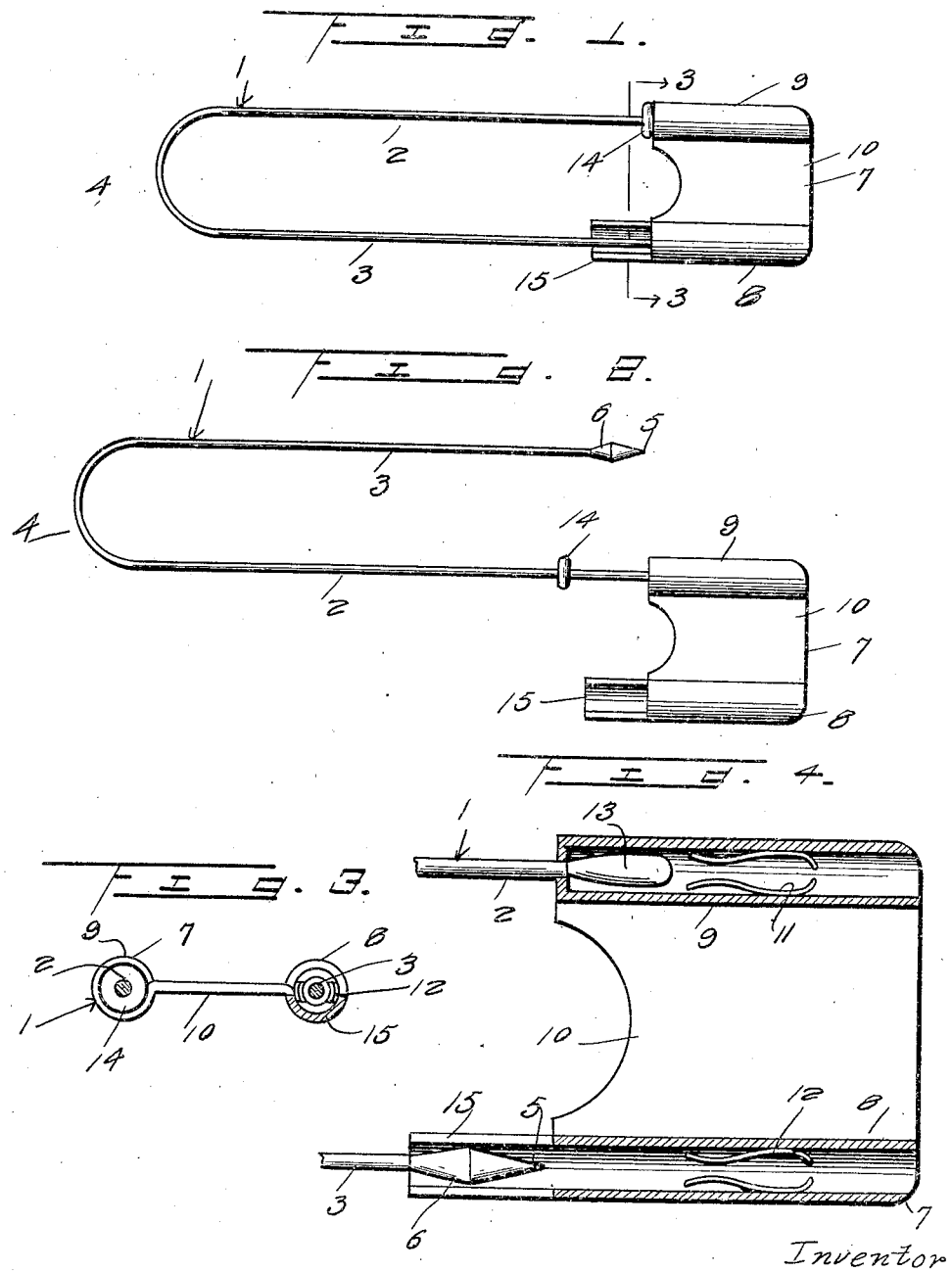
Inventor
E. S. Ralph.
By
Attorney

UNITED STATES PATENT OFFICE.

ELMER S. RALPH, OF MAYWOOD, ILLINOIS.

SAFETY-PIN.

1,360,794.　　　　Specification of Letters Patent.　　Patented Nov. 30, 1920.

Application filed December 5, 1919. Serial No. 342,623.

*To all whom it may concern:*

Be it known that I, ELMER S. RALPH, a citizen of the United States, residing at Maywood, in the county of Cook and State of Illinois, have invented certain new and useful Improvements in Safety-Pins; and I do hereby declare the following to be a full, clear, and exact description of the invention, such as will enable others skilled in the art to which it appertains to make and use the same.

This invention relates to new and useful improvements in safety pins of the character having parallel legs and has for its primary object the provision of a head rotatably and slidably connected to one leg and which is provided with means to receive and grasp the other leg for retaining goods on said leg and which can be readily disconnected from the leg and swung laterally thereof whereby said leg may be conveniently removed and replaced in the goods.

Another object of this invention is the provision of a safety pin of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a plan view of a safety pin constructed in accordance with my invention and illustrating the same in a closed position, Fig. 2 is a similar view illustrating the pin in an open position, Fig. 3 is a transverse sectional view taken on the line 3—3 of Fig. 1 illustrating the means of securing the head to the legs of the pin, and Fig. 4 is a longitudinal sectional view illustrating the construction of the clamps within the head.

Referring in detail to the drawing, the numeral 1 indicates a pin consisting of parallel legs 2 and 3 connected by a bight portion 4. The end of the leg 3 has formed thereon a pointed head 5 provided with inclined shoulders 6 and which pointed head is adapted to facilitate the insertion of the leg 3 through goods.

A fastening head 7 includes hollow parallel portions 8 and 9 connected by a web 10. Spring clasps 11 and 12 are secured within the hollow portions 8 and 9 of the head 7 for the purpose of receiving the ends of the legs 2 and 3. The end of the leg 2 is provided with a knob 13 which is adapted to be frictionally gripped by the clamp or clasp 11 while the clasp 12 is adapted to receive the head 5 of the leg 3 and engage the inclined shoulders 6 to retain the pin in a closed position. A knob 14 is formed on the leg 2 at a point spaced from the knob 13 for the purpose of limiting the inward movement of the leg 2 within the hollow portion 8 of the head 7, while the knob 13 is of such a size as to prevent the leg 2 from being entirely withdrawn from the head 7 but will permit the head 7 to be rotated about the leg 2.

A guard 15 is secured to the end of the hollow portion 9 of the head 7 and is of concaved shape in cross section to receive the head 5 of the leg 3 to properly aline the head with the hollow portion 9 so that on moving the legs inwardly of the head 7 the clasps 11 and 12 will receive the knob 13 and head 5 positively locking the head in a closed position.

While I have shown and described the preferred embodiment of my invention, it will be understood that minor changes in construction, combination and arrangement of parts may be made without departing from the spirit and scope of the invention as claimed.

Having thus described my invention what I claim is:—

1. A safety pin comprising a pin portion including parallel legs connected together by a bight portion, a head rotatably and slidably connected to one of the legs, and means in said head for receiving and gripping the other leg for closing the pin portion.

2. A safety pin comprising a pin portion including parallel legs connected together by a bight portion, a head rotatably and slidably connected to one of the legs, a clamp in said head for receiving and gripping the other leg for closing the pin portion.

3. A safety pin comprising a pin portion including parallel legs connected together by a bight portion, a head rotatably and slidably connected to one of the legs, a clamp in said head for receiving and gripping the other leg for closing the pin portion, and a second clamp in the head for receiving and gripping the first named leg when the second named leg is gripped by the first named clamp.

4. A safety pin comprising a pin portion including parallel legs connected together by a bight portion, a head having spaced hollow portions to slidably receive the ends of the legs, means in one of the hollow portions for receiving and gripping one of the legs, and means rotatably and slidably securing the other leg in the other hollow portion.

5. A safety-pin comprising a pin portion including parallel legs connected together by a bight portion, a pointed head having inclined shoulders formed on the end of one of the legs, spaced knobs formed on the other leg, a second head having spaced hollow portions receiving the ends of the legs and said spaced knobs limiting the outward and inward movement of one of the legs in one of the hollow portions, a clamp in the last named hollow portion and receiving one of the knobs, a second clamp in the other hollow portion and receiving the first named head, and a guard secured to the last named hollow portion.

In testimony whereof I affix my signature in presence of two witnesses.

ELMER S. RALPH.

Witnesses:
LAWRENCE MORENO,
ARTHUR BENSON.